United States Patent
Wang et al.

(10) Patent No.: US 10,085,276 B2
(45) Date of Patent: Sep. 25, 2018

(54) FRAME CONFIGURATION OF DYNAMIC UPLINK/DOWNLINK SWITCH

(71) Applicant: QUALCOMM Incorporated, San Diego, CA (US)

(72) Inventors: Hua Wang, Basking Ridge, NJ (US); Tingfang Ji, San Diego, CA (US); Naga Bhushan, San Diego, CA (US); Junyi Li, Chester, NJ (US); Saurabha Rangrao Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 15/192,705

(22) Filed: Jun. 24, 2016

(65) Prior Publication Data

US 2017/0171877 A1    Jun. 15, 2017

Related U.S. Application Data

(60) Provisional application No. 62/265,120, filed on Dec. 9, 2015.

(51) Int. Cl.
| | |
|---|---|
| *H04W 72/12* | (2009.01) |
| *H04L 5/00* | (2006.01) |
| *H04L 5/14* | (2006.01) |

(52) U.S. Cl.
CPC ......... *H04W 72/1263* (2013.01); *H04L 5/003* (2013.01); *H04L 5/0094* (2013.01);
(Continued)

(58) Field of Classification Search
CPC ............ H01M 2/04; H01M 2/06; H01M 2/30; H04W 72/1263; H04W 72/1294
See application file for complete search history.

(56) References Cited

U.S. PATENT DOCUMENTS

| | | |
|---|---|---|
| 8,184,571 B2 | 5/2012 | Yun et al. |
| 8,358,625 B2 | 1/2013 | Koskinen |
| (Continued) | | |

FOREIGN PATENT DOCUMENTS

WO    WO-2014112915 A1    7/2014

OTHER PUBLICATIONS

ISA/EP, International Search Report and Written Opinion of the International Searching Authority, Int'l Application No. PCT/US2016/064563, Feb. 28, 2017, European Patent Office, Rijswijk, NL, 13 pgs.

*Primary Examiner* — Kashif Siddiqui
(74) *Attorney, Agent, or Firm* — Clint R. Morin; Holland & Hart

(57) ABSTRACT

Methods, systems, and apparatuses are described for wireless communication at a cell. The cell may transmit, from the cell to a plurality of neighboring cells, a frame configuration message. The frame configuration message may identify the current frame as a switching frame capable of dynamically switching a communication direction. The cell may switch, based at least in part on the frame configuration message, a communication direction between the cell and a user equipment (UE) for at least a portion of the current frame. The cell may communicate with the UE during the current frame according to the switched communication direction.

30 Claims, 9 Drawing Sheets

(52) U.S. Cl.
CPC ....... *H04L 5/0096* (2013.01); *H04W 72/1294* (2013.01); *H04L 5/001* (2013.01); *H04L 5/0035* (2013.01); *H04L 5/0073* (2013.01); *H04L 5/14* (2013.01)

(56) References Cited

U.S. PATENT DOCUMENTS

| | | |
|---|---|---|
| 9,084,275 B2 | 7/2015 | Wang et al. |
| 2011/0211503 A1 | 9/2011 | Che et al. |
| 2011/0222398 A1* | 9/2011 | Ribeiro ............. H04W 74/0816 370/230 |
| 2012/0327821 A1 | 12/2012 | Lin et al. |
| 2013/0188516 A1 | 7/2013 | He et al. |
| 2013/0258938 A1* | 10/2013 | Sagfors ................ H04W 72/02 370/312 |
| 2013/0315114 A1* | 11/2013 | Seo ........................ H04L 5/001 370/280 |
| 2015/0334704 A1* | 11/2015 | Wei .................. H04W 72/0446 370/294 |
| 2016/0381680 A1* | 12/2016 | Yasukawa ......... H04W 72/1289 370/280 |

\* cited by examiner

FRAME CONFIGURATION OF DYNAMIC UPLINK/DOWNLINK SWITCH

CROSS REFERENCE

The present application for patent claims priority to U.S. Provisional Patent Application No. 62/265,120 by Wang et al., entitled "Frame Configuration of Dynamic Uplink/Downlink Switch," filed Dec. 9, 2015, assigned to the assignee hereof.

BACKGROUND

Field of the Disclosure

The present disclosure, for example, relates to wireless communication systems, and more particularly to frame configuration for dynamic uplink/downlink switching.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Wireless communication systems generally use an open medium such that closely located transmissions may cause interference with each other. Interference management is an important component of wireless communication systems. For example, wireless communication systems that use time-division duplexing (TDD) techniques may be synchronized in traffic direction, e.g., all cells are either performing uplink communications or downlink communications. In some situations, it may be beneficial for certain cells to be able to switch communication direction. For example, if there is no downlink data to communicate during a downlink communication frame, switching to an uplink data communication during the frame may improve spectral efficiency. One (or a few) cell(s) switching their communication direction, however, may introduce interference to neighboring cells.

SUMMARY

The described techniques generally relate to improved methods, systems, or apparatuses that manage interference caused by dynamically switching frames (from downlink-to-uplink (DL-UL) and/or from uplink-to-downlink (UL-DL)). The described techniques may utilize a fixed frame structure and a dynamic frame structure. In addition, the described techniques may provide an improved arrangement of the fixed and dynamic frame structures that mitigates interference introduced by switching a frame. In some aspects, one or more cells that are located near (or next to) each other may dynamically determine to switch a frame. A buffer zone may be created between cells that dynamically switch a frame and cells that do not wish to switch the frame. For example, a cell that switches a frame may transmit a frame configuration message to other cells that indicates the current frame is a switching frame. The switching cell may switch a communication direction between the cell and a user equipment (UE) during at least a portion of the frame and communicate with the UE during the switched frame. A cell located in a buffer zone may receive the frame configuration message and determine that it is a certain distance from the switching cell. The buffer cell may not switch a communication direction during the frame. The buffer cell may use a long or extended gap period before communicating with a UE.

A method for wireless communication is described. The method may include: transmitting, from a first cell to a plurality of neighboring cells, a frame configuration message, the frame configuration message identifying a current frame as a switching frame capable of dynamically switching a communication direction; switching, based at least in part on the frame configuration message, a communication direction between the first cell and a user equipment (UE) for at least a portion of the current frame; and communicating with the UE during the current frame according to the switched communication direction.

Switching the communication direction may include switching a downlink communication to an uplink communication. Switching the communication direction may include switching an uplink communication to a downlink communication. The method may include transmitting a communication direction override message to the plurality of neighboring cells. The method may include receiving, based at least in part on the frame configuration message, a clear-to-send (CTS) message from at least one of the plurality of neighboring cells. The method may include: determining a gap time associated with the current frame being a switching frame; and delaying a communication with the UE for at least the gap time. The frame configuration message may include a physical downlink control channel (PDCCH) message.

A method for wireless communication is described. The method may include: receiving, at a first cell and from a second cell, a frame configuration message, the frame configuration message identifying a current frame as a switching frame for the second cell; determining that the first cell is located a predetermined distance from the second cell; and delaying a communication with a user equipment (UE) a gap time based at least in part on the current frame being a switching frame for the second cell and the first cell being the predetermined distance from the second cell.

The method may include determining, based at least in part on the first cell being a predetermined distance from the second cell, that the current frame is not a switching frame for the first cell. The method may include refraining, based at least in part on the current frame not being a switching frame, from converting a communication direction with the UE during the current frame. The gap time may be an extended gap time with respect to communication gap times associated with the second cell. The first cell may be associated with a cell cluster different from a cell cluster of the second cell.

An apparatus for wireless communication is described. The apparatus may include: a processor; memory in electronic communication with the processor; and instructions stored in the memory, the instructions being executable by the processor to: transmit, from a first cell to a plurality of neighboring cells, a frame configuration message, the frame configuration message identifying a current frame as a switching frame capable of dynamically switching a communication direction; switch, based at least in part on the frame configuration message, a communication direction between the first cell and a user equipment (UE) for at least a portion of the current frame; and communicate with the UE during the current frame according to the switched communication direction.

The instructions to switch the communication direction are further executable by the processor to switch a downlink communication to an uplink communication. The instructions to switch the communication direction are further executable by the processor to: switch an uplink communication to a downlink communication. The apparatus may include instructions executable by the processor to transmit a communication direction override message to the plurality of neighboring cells. The apparatus may include instructions executable by the processor to receive, based at least in part on the frame configuration message, a clear-to-send (CTS) message from at least one of the plurality of neighboring cells.

The apparatus may include instructions executable by the processor to: determine a gap time associated with the current frame being a switching frame; and delay a communication with the UE for at least the gap time. The frame configuration message may include a physical downlink control channel (PDCCH) message.

An apparatus for wireless communication is described. The apparatus may include: a processor; memory in electronic communication with the processor; and instructions stored in the memory, the instructions being executable by the processor to: receive, at a first cell and from a second cell, a frame configuration message, the frame configuration message identifying a current frame as a switching frame for the second cell; determine that the first cell is located a predetermined distance from the second cell; and delay a communication with a user equipment (UE) a gap time based at least in part on the current frame being a switching frame for the second cell and the first cell being the predetermined distance from the second cell.

The apparatus may include instructions executable by the processor to determine, based at least in part on the first cell being a predetermined distance from the second cell, that the current frame is not a switching frame for the first cell. The apparatus may include instructions executable by the processor to refrain, based at least in part on the current frame not being a switching frame, from converting a communication direction with the UE during the current frame. The gap time may be an extended gap time with respect to communication gap times associated with the second cell. The first cell may be associated with a cell cluster different from a cell cluster of the second cell.

An apparatus for wireless communication is described. The apparatus may include: means for transmitting, from a first cell to a plurality of neighboring cells, a frame configuration message, the frame configuration message identifying a current frame as a switching frame capable of dynamically switching a communication direction; means for switching, based at least in part on the frame configuration message, a communication direction between the first cell and a user equipment (UE) for at least a portion of the current frame; and means for communicating with the UE during the current frame according to the switched communication direction.

The means for switching the communication direction may include means for switching a downlink communication to an uplink communication. The means for switching the communication direction may include means for switching an uplink communication to a downlink communication. The apparatus may include means for transmitting a communication direction override message to the plurality of neighboring cells. The apparatus may include means for receiving, based at least in part on the frame configuration message, a clear-to-send (CTS) message from at least one of the plurality of neighboring cells.

An apparatus for wireless communication is described. The apparatus may include: means for receiving, at a first cell and from a second cell, a frame configuration message, the frame configuration message identifying a current frame as a switching frame for the second cell; means for determining that the first cell is located a predetermined distance from the second cell; and means for delaying a communication with a user equipment (UE) a gap time based at least in part on the current frame being a switching frame for the second cell and the first cell being the predetermined distance from the second cell.

The apparatus may include means for determining, based at least in part on the first cell being a predetermined distance from the second cell, that the current frame is not a switching frame for the first cell.

A non-transitory computer-readable medium storing computer-executable code for wireless communication is described. The code executable by a processor to: transmit, from a first cell to a plurality of neighboring cells, a frame configuration message, the frame configuration message identifying a current frame as a switching frame capable of dynamically switching a communication direction; switch, based at least in part on the frame configuration message, a communication direction between the first cell and a user equipment (UE) for at least a portion of the current frame; and communicate with the UE during the current frame according to the switched communication direction.

A non-transitory computer-readable medium storing computer-executable code for wireless communication is described. The code executable by a processor to: receive, at a first cell and from a second cell, a frame configuration message, the frame configuration message identifying a current frame as a switching frame for the second cell; determine that the first cell is located a predetermined distance from the second cell; and delay a communication with a user equipment (UE) a gap time based at least in part on the current frame being a switching frame for the second cell and the first cell being the predetermined distance from the second cell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Conventional frame switching techniques in a TDD synchronized wireless communication system may include each cell (or base station) to switching for the frame. For example, when a cell switches an UL frame to perform a high priority DL communication, each cell may also be forced to switch the frame to DL communications. That may be inefficient when, for example, the other cells have UL communications to perform during the frame.

The described features relate to improved systems, methods, and/or apparatuses for dynamically switching a frame (e.g., UL-DL switching and/or DL-UL switching) where not every other cell in the wireless communication system is forced to switch the frame. For example, a cell may determine to switch a frame (e.g., the cell may have data to communicate with a UE in its coverage area during the frame). The cell may transmit frame configuration message that informs other cells and/or UEs that the frame is a switching frame, e.g., that the frame is being switch from UL-DL or from DL-UL. The cell may switch a communication direction between the cell the UE for at least a portion of the frame, e.g., for one or more subframes of the frame, and communicate with the UE during the frame according to the switched communication direction.

A cell that is near the switching cell may receive the frame configuration message transmitted from the switching cell and determine that it is a certain distance from the switching cell. Thus, the cell may determine that it is a buffer cell and therefore not need to switch the current frame. The buffer cell may delay communicating with a UE within its coverage area by an extended gap period to provide a buffer between switching cells and non-switching cells. The extended gap period may mitigate interference caused by the switching cells transmissions and non-switching cells transmissions. Thus, cells inside the buffer area may switch a communication direction during the frame and cells in and beyond the buffer area may continue communicating in the original direction during the frame.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Additionally or alternatively, features described with respect to some examples may be combined in other examples.

Figure 1:
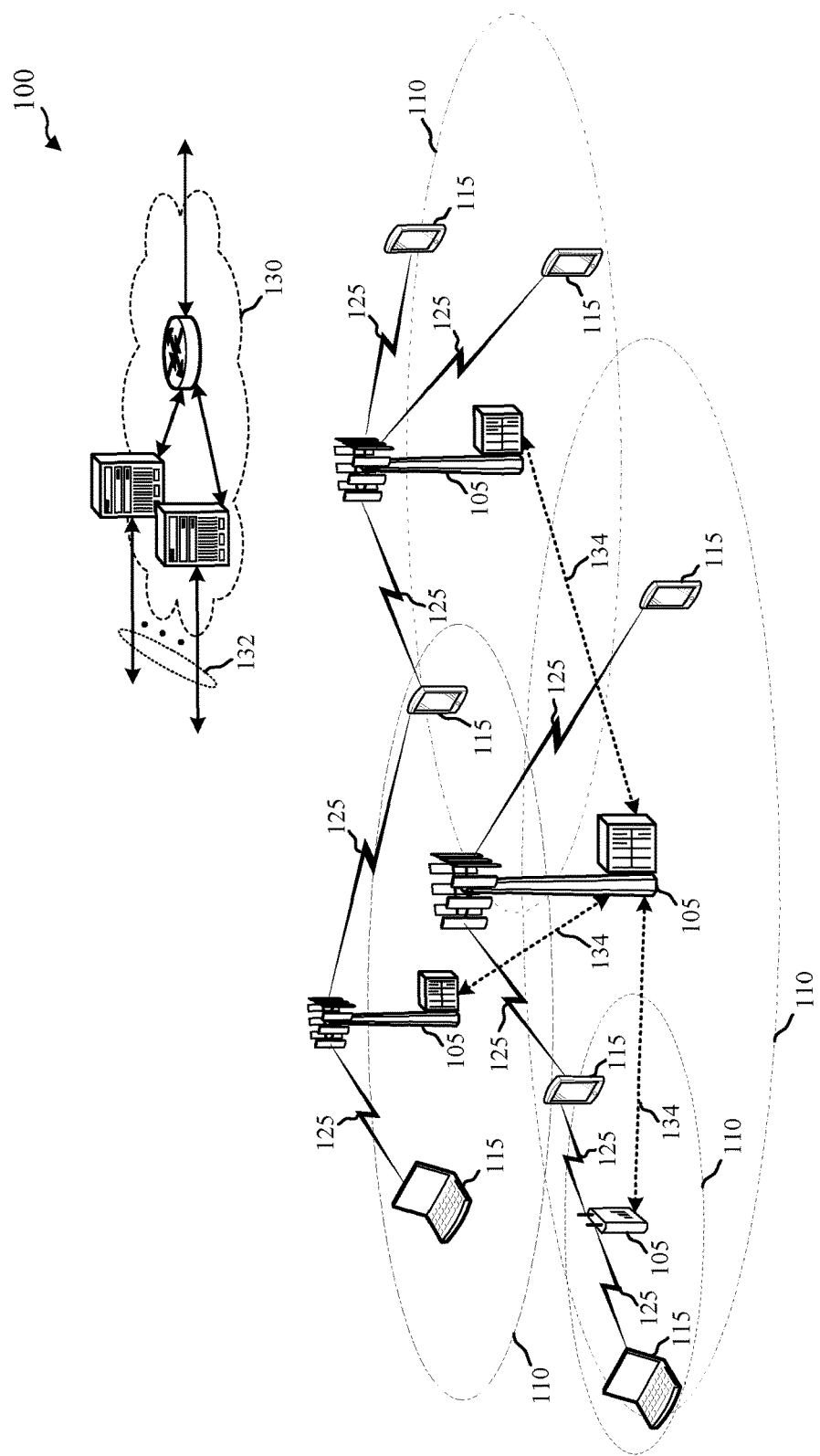
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support a base station 105 (or a cell of a base station 105) dynamically switching a communication direction of a frame where not every base station 105 switches their communication direction for the frame. Base stations 105 of the wireless communications system 100 may support interference mitigation techniques that might otherwise be introduced by certain base stations 105 switching their communication directions. It is to be understood that a base station 105 switching their communication direction may include switching a downlink communication direction to an uplink communication direction (DL-UL) and/or may include switching an uplink communication direction to a downlink communication direction (UL-DL).

In some aspects, a frame of a base station 105 may be scheduled for a communication direction, e.g., the frame may be scheduled for DL communications by all base stations 105. A base station 105 (a first or switching base station 105) may, however, determine that it has UL communications to receive during the frame and that the UL communications have a priority level above a threshold level (e.g., a high priority). Therefore, the switching base station 105 may determine to switch the frame (or at least a portion of the frame) from a downlink communication direction to an uplink communication direction. The switching base station 105 may transmit, to neighboring base stations 105 or cells, a frame configuration message, e.g., a DL override message. The frame configuration message may include an indication or identification of the frame as a switching frame where the communication direction may be switched. The switching base station 105 may switch the communication direction between the base station 105 and a UE 115 within its geographic coverage area 110. The base station 105 and the UE 115 may communicate according to the switched direction (e.g., perform UL communications).

A neighboring base station 105 (e.g., a second or non-switching base station 105) may receive the frame configuration message from the switching base station that identifies the frame as a switching frame. The non-switching base station 105 may determine that it is located at least a predetermined distance from the switching base station, e.g., a predetermined physical distance, a predetermined transmission distance, that the non-switching base station 105 is non-contiguous with the switching base station 105, etc. The non-switching base station 105 may determine that it does not need to switch a communication direction during the switching frame based at least in part on the determined distance from the switching base station 105. The non-switching base station 105 may delay a communication with a UE 115 within its geographic coverage area 110 for a gap time that is selected or calculated based at least in part on the frame being a switching frame and/or the non-switching base station 105 being the predetermined distance from the switching base station 105. The gap time may be an extended gap time such that interference introduced by the switching frame may be mitigated and/or reduced.

Figure 2:
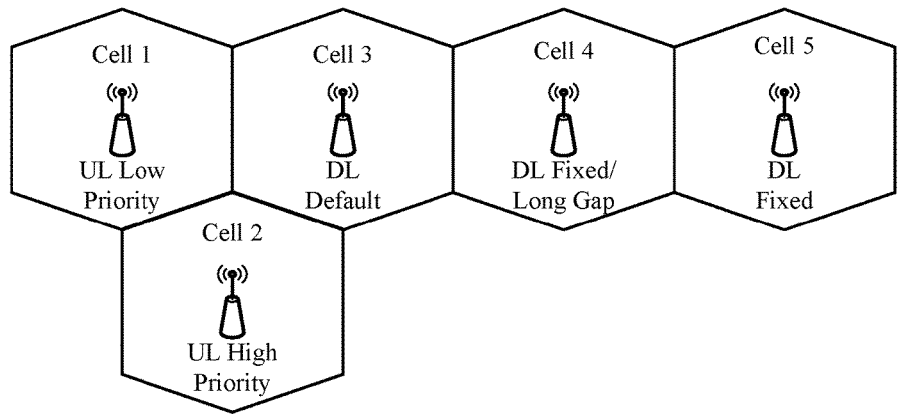
FIG. 2 shows a block diagram of aspects of a wireless communication system that supports dynamic frame switching, in accordance with aspects of the present disclosure.

Turning to FIG. 2, which shows a block diagram of aspects of a wireless communication system 200 that supports dynamic frame switching, in accordance with aspects of the present disclosure. Wireless communication system 200 may include a plurality of cells, illustrated as cells 1-5. Cells 1-5 may be an example of base station 105 described with reference to FIG. 1. Frames 1-5 are also illustrated and correspond to cells 1-5, respectively. For example, frame 1 corresponds to the steps or functions performed by or at cell 1, frame 2 corresponds to the steps or functions performed by or at cell 2, and so on. Generally, frames 1-5 illustrate frame types employed by cells in a dynamic frame switching example.

Broadly, wireless communication system 200 illustrates an example where a set of nearby cells determine to switch UL and DL communication directions, e.g., cells located in a stadium. The wireless communication system 200 provides a flexible mechanism for the set of cells to switch their communication direction in each frame, as needed, and efficient for other cells in the wireless communication system 200 to continue to use the normal frame structure. Generally, wireless communication system 200 supports a buffer zone of cells between the switching cells and other cells, e.g., non-switching cells. For example, a non-switching cell that are three hops away from the switching cell may use a fixed DL frame type. A non-switching cell that is two hops away from a switching cell may use a fixed DL frame with a long or extended gap time and act as a buffer zone. Switching cells may use a dynamic switching frame that provide for interference management.

Generally, the current frame may be configured or otherwise scheduled as a DL communication frame. Cells 1 and 2, however, may determine that they each have UL communications to perform during the current frame. Cell 1 may have a low priority UL communications and cell 2 may have a high priority UL communications. Cells 3, 4, and 5, however, may have DL communications to perform during the current frame. Thus, cells 1 and 2 may be considered switching cells and cells 3-5 may be considered non-switching cells. Cells 1-5 may be a synchronized wireless communication system 200 and therefore frames 1-5 may be TDD frames. Frames 1 and 2 may be considered dynamic frame types. Frame 3 may be considered a default dynamic frame type. Frame 4 may be considered a dynamic fixed frame type with a long gap period. Frame 5 may be considered a dynamic fixed frame type.

Initially, each cell may transmit scheduling information during the frame. For example, cells 1 and 2 (DL-UL switching cells) may transmit UL scheduling information to the UEs 115 located in their respective coverage areas. The UL scheduling information may include an indication that the current frame is a switching frame, from the perspectives of cells 1 and 2. Cell 3 may transmit DL scheduling information to the UEs 115 located in its coverage area. Cells 4 and 5 may transmit their scheduling information via a physical downlink control channel (PDCCH) message. In some aspects, each of cells 1-5 transmit their respective scheduling information in PDCCH messages. The scheduling information may identify which resources are to be used for communications (e.g., grants), which subframes of the current frame are to be used for communication, etc. The scheduling information message transmitted from cell 2 may be considered a frame configuration message that provides an indication to the other cells that the current frame is a switching frame.

For each cell, the frame may include a gap following the scheduling information. The gaps may be used by the cells for processing the scheduling information, and the like. Cells 2, 3, and 5 may use a short gap and cells 1 and 4 may use a long gap. In response to the UL scheduling information indicating that cell 2 has high priority UL data to communicate, cell 2 may transmit an UL override message following the gap time. The UL override message may provide an indication of resources associated for UL communications. The UL override message may also provide an indication (or further indication) to other cells that the current frame is a DL-UL switching frame. UEs 115 located within the coverage area of cell 2, as well as adjacent cells, may receive the UL override message. In response, a UE 115 (or more than one UE 115) located in or near the coverage area of cell 3 may transmit a DL clear-to-send (CTS) message. Generally, the UL override message and/or the DL CTS message may provide a signal that the frame is a switching frame and provide an indication that interference avoidance or mitigation techniques should be employed (e.g., transmission power level adjustment, transmission frequency/timing information, etc.). After transmission of the UL override message and the DL CTS message, cells 2 and 3 may include a second gap time that provides for preparation and implementation of the interference mitigation protocols.

At the end of the gap times for frames 1-4, the cells may perform their respective communication transmissions. Cells 1 and 2 may receive UL data transmitted from UEs 115 located within their respective coverage area. Cells 3 and 4 may transmit DL data to UEs 115 located within their respective coverage area. Cell 5, however, may begin transmitting its DL data following the initial short gap time. For example, cell 5 may use a DL fixed frame type that includes an initial gap time following the PDCCH message transmission and preceding the DL data transmission from the BS. Following the DL data transmissions from cells 3-5, frames 3-5 include another gap time that allows the cells to transition from DL to UL communications, e.g., retune. Frames 1-5 end with cells 1-5, respectively, receiving UL control message(s) from UEs 115 within their respective coverage areas.

Thus, the wireless communication system 200 includes buffer zones separating cells in a dynamic frame switching environment. Each cell within a buffer zone uses a distinct frame type to account for frame switching and mitigate interference caused by the frame switching.

Figure 3:
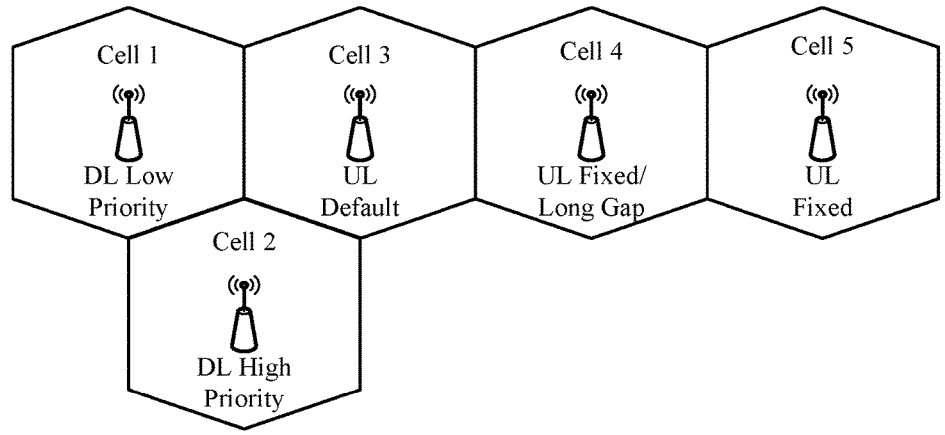
FIG. 3 shows a block diagram of aspects of a wireless communication system that supports dynamic frame switching, in accordance with aspects of the present disclosure.

Turning to FIG. 3, which shows a block diagram of aspects of a wireless communication system 300 that supports dynamic frame switching, in accordance with aspects of the present disclosure. Wireless communication system 300 may include a plurality of cells, illustrated as cells 1-5. Cells 1-5 may be an example of base station 105 described with reference to FIG. 1. Frames 1-5 are also illustrated and correspond to cells 1-5, respectively. For example, frame 1 corresponds to the steps or functions performed by or at cell 1, frame 2 corresponds to the steps or functions performed by or at cell 2, and so on. Generally, frames 1-5 illustrate frame types employed by cells in a dynamic frame switching environment.

Broadly, wireless communication system 300 illustrates an example where a set of nearby cells determine to switch UL and DL communication directions, e.g., cells located in a stadium. The wireless communication system 300 provides a flexible mechanism for the set of cells to switch their communication direction in each frame, as needed, and efficient for other cells in the wireless communication system 300 to continue to use the normal frame structure. Generally, wireless communication system 300 supports a buffer zone of cells between the switching cells and other cells, e.g., non-switching cells. For example, a non-switching cell that is three hops away from the switching cell may use a fixed UL frame type. A non-switching cell that is two hops away from a switching cell may use a fixed UL frame with a long or extended gap time and act as a buffer zone. Switching cells may use a dynamic switching frame that provide for interference management.

Generally, the current frame may be configured or otherwise scheduled as an UL communication frame. Cells 1 and 2, however, may determine that they each have DL communications to perform during the current frame. Cell 1 may have a low priority DL communications and cell 2 may have a high priority DL communications. Cells 3, 4, and 5, however, may have UL communications to perform during the current frame. Thus, cells 1 and 2 may be considered switching cells and cells 3-5 may be considered non-switching cells. Cells 1-5 may be a synchronized wireless communication system 300 and therefore frames 1-5 may be TDD frames. Frames 1 and 2 may be considered dynamic frame types. Frame 3 may be considered a default dynamic frame type. Frame 4 may be considered a dynamic fixed frame type with a long gap period. Frame 5 may be considered a dynamic fixed frame type.

Initially, each cell may transmit scheduling information during the frame. For example, cells 1 and 2 (UL-DL switching cells) may transmit DL scheduling information to the UEs 115 located in their respective coverage areas. The DL scheduling information may include an indication that the current frame is a switching frame, from the perspectives of cells 1 and 2. Cell 3 may transmit UL scheduling information to the UEs 115 located in its coverage area. Cells 4 and 5 may transmit their scheduling information via a PDCCH message. In some aspects, each of cells 1-5 transmit their respective scheduling information in PDCCH messages. The scheduling information may identify which resources are to be used for communications (e.g., grants), which subframes of the current frame are to be used for communication, etc. The scheduling information message transmitted from cell 2 may be considered a frame configuration message that provides an indication to the other cells that the current frame is a switching frame.

For each cell, the frame may include a gap following the scheduling information. The gaps may be used by the cells and/or UEs 115 for processing the scheduling information.

Cells 2, 3, and 5 may use a short gap time and cells 1 and 4 may use a long gap time. In response to the DL scheduling information indicating that cell 2 has high priority DL data to communicate, cell 2 may transmit a DL override message following the gap time. The DL override message may provide an indication of resources associated for DL communications. The DL override message may also provide an indication (or further indication) to other cells that the current frame is a UL-DL switching frame. UEs 115 located within the coverage area of cell 2, as well as adjacent cells, may receive the DL override message. In response, a UE 115 (or more than one UE 115) located in or near the coverage area of cell 3 may transmit an UL CTS message. Generally, the DL override message and/or the UL CTS message may provide a signal that the frame is a switching frame and provide an indication that interference avoidance or mitigation techniques should be employed (e.g., transmission power level adjustment, transmission frequency/timing selection, etc.). After transmission of the DL override message and the UL CTS message, cells 2 and 3 may include a second gap time that provides for preparation and implementation of the interference mitigation protocols.

At the end of the gap times for frames 1-4, the cells may perform their respective communication transmissions. Cells 1 and 2 may transmit DL data to UEs 115 located within their respective coverage area. Cells 3 and 4 may receive UL data from UEs 115 located within their respective coverage area. Cell 5, however, may begin receiving its UL data following the initial short gap time. For example, cell 5 may use a UL fixed frame type that includes an initial gap time following the PDCCH message transmission and preceding the UL data transmission to the BS. Following the UL data reception at cells 3-5, frames 3-5 include another gap time that allows the cells to transition from UL to DL communications, e.g., retune. Frames 1-5 end with cells 1-5, respectively, receiving UL control message(s) from UEs 115 within their respective coverage areas.

Thus, the wireless communication system 300 includes buffer zones separating cells in a dynamic frame switching environment. Each cell within a buffer zone uses a distinct frame type to account for frame switching and mitigate interference caused by the frame switching.

Figure 4:
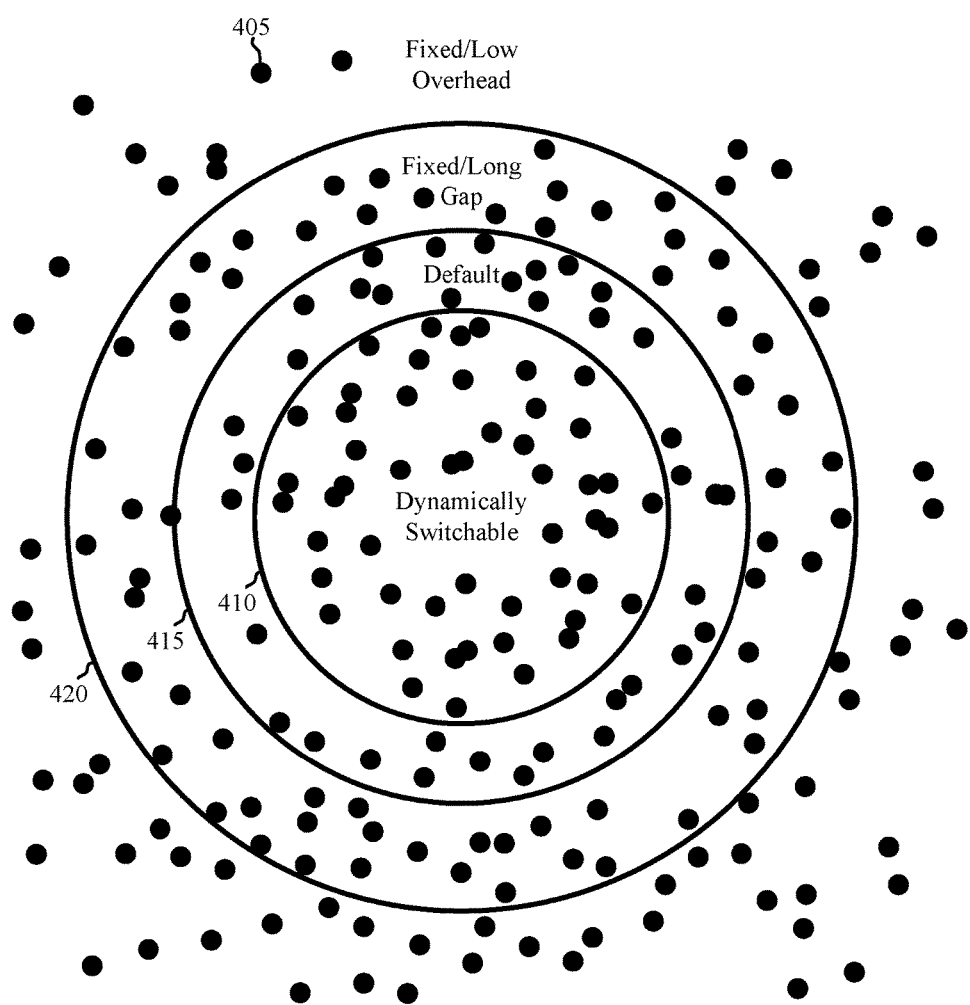
FIG. 4 shows a cluster diagram of aspects of a wireless communication system that supports dynamic frame switching, in accordance with aspects of the present disclosure.

Turning to FIG. 4, which shows a cluster diagram 400 of aspects of a wireless communication system that supports dynamic frame switching, in accordance with aspects of the present disclosure. Cluster diagram 400 may include a plurality of cells 405 (only one cell 405 being labeled for ease of reference). Cells 405 may be an example of base station 105 described with reference to FIG. 1 and/or cells 1-5 described with reference to FIGS. 2 and 3. Each of the cells 405 may support aspects of the dynamic frame switching techniques described with reference to FIGS. 1-3. Generally, cluster diagram illustrates an example where cells 405 may be allocated to one of buffer zones 410, 415, or 420 in a dynamic frame switching environment.

Generally, cells 405 located in buffer zone 410 may employ a dynamic frame type to support dynamically switching a frame type (e.g., UL-DL and/or DL-UL). Examples of a dynamic frame type may include aspects of a frame type described with reference to FIGS. 2 and/or 3, e.g., frame 1 and/or frame 2 of FIGS. 2-3. Cells 405 located in buffer zone 415 may employ a default frame type, such as frame 3 described with reference to FIGS. 2-3. Cells 405 located in buffer zone 420 may employ a fixed frame type with a long or extended gap time, such as frames 4 described with reference to FIGS. 2 and 3. Cells 405 located outside of buffer zone 420 may employ a fixed frame type, such as frames 5 described with reference to FIGS. 2 and 3. The fixed frame type used by cells 405 located outside of buffer zone 420 provides for lower overhead with respect to the other described frame types.

Thus, cluster diagram 400 provides for cells 405 located within buffer zone 410 to switch a communication direction for at least a portion of a frame. The cells 405 located within buffer zone 410 may use the dynamic frame type to provide for switching the communication direction. The cells 405 located within buffer zone 415 (e.g., the first tier cells 405) may also use a dynamic frame type to provide for these cells 405 and the cells 405 within the buffer zone 410 to manage interference caused by the switching frame. The cells located within buffer zone 420 (e.g., the second tier cells 405) may use the fixed frame type with long gap time and act as a buffer zone (e.g., separate the interior cells 405 from cells 405 located outside of buffer zone 420). Cells 405 located outside of buffer zone 420 may use low overhead fixed frame type to minimize overhead and yet permit the switching cells 405 to switch a communication direction of the current frame.

Figure 5:
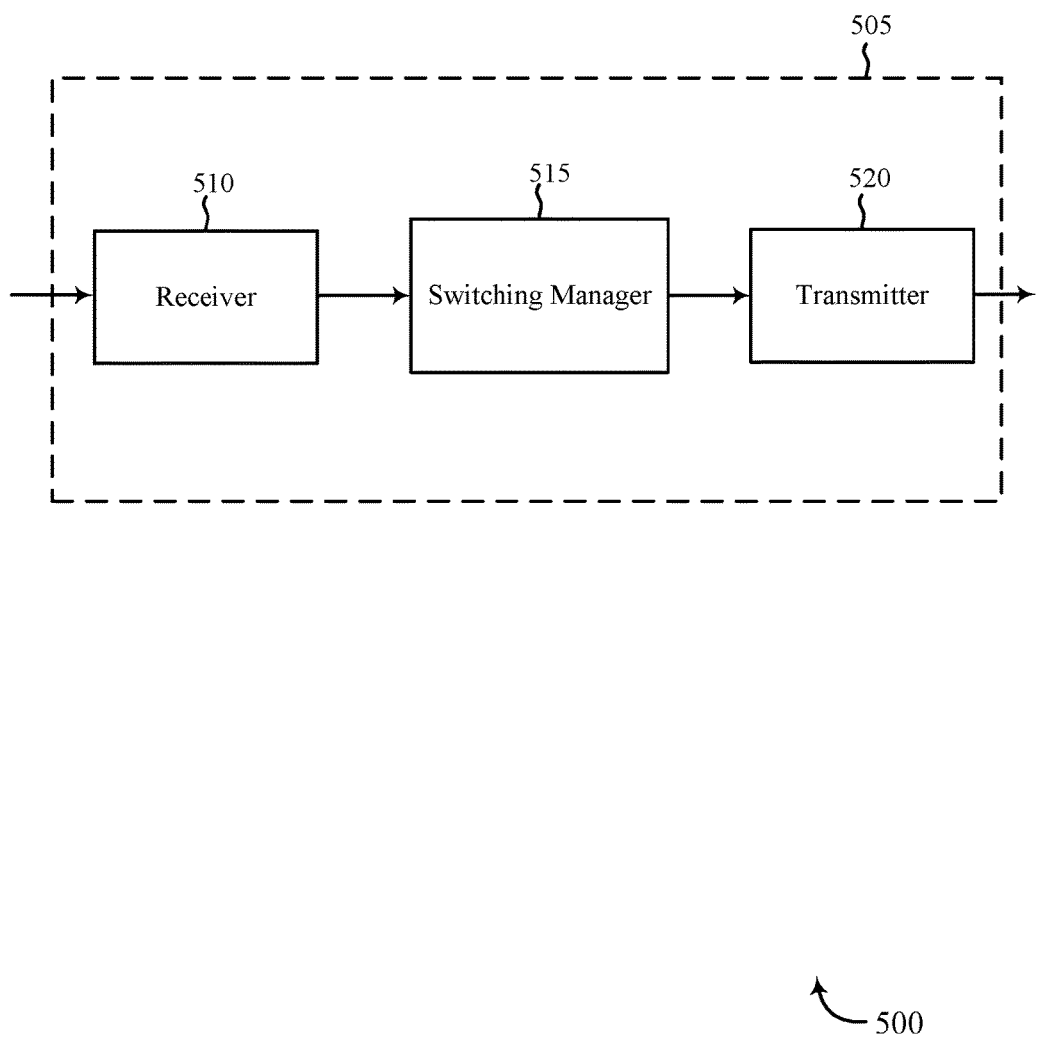
FIG. 5 shows a block diagram of an apparatus for use in wireless communication, in accordance with various aspects of the present disclosure.

FIG. 5 shows a block diagram 500 of an apparatus 505 for use in wireless communication, in accordance with various aspects of the present disclosure. In some examples, the apparatus 505 may be an example of aspects of one or more of the base stations 105 and/or cells described with reference to FIGS. 1-4. In some examples, the apparatus 505 may be part or include an LTE/LTE-A eNB and/or an LTE/LTE-A base station. The apparatus 505 may also be a processor. The apparatus 505 may include a receiver 510, a switching manager 515, and/or a transmitter 520. Each of these components may be in communication with each other.

The components of the apparatus 505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as an RF receiver operable to receive feedback signals, frame configuration messages, data messages, etc., from UEs 115 and/or other cells according to aspects of the present disclosure. The receiver 510 may be used to receive various types of data and/or control signals over one or more communication links of a wireless communication system, such as one or more communication links of the wireless communications system 100 described with reference to FIG. 1 and/or wireless communication systems 200 and/or 300.

In some examples, the transmitter 520 may include at least one RF transmitter, such as at least one RF transmitter operable to transmit control messages, frame configuration messages, data messages, etc., according to aspects of the present disclosure. The transmitter 520 may be used to transmit various types of data and/or control signals over one or more communication links of a wireless communication system, such as one or more communication links of the wireless communications system 100 described with reference to FIG. 1 and/or wireless communication systems 200 and/or 300.

In some examples, the switching manager 515 may monitor, control, provide a means for, other otherwise manage aspects of a switching frame for the apparatus 505. For example, the switching manager 515 may, in cooperation with the transmitter 520, transmit, from the apparatus 505 to a plurality of neighboring cells, a frame configuration message. The frame configuration message may identify a current frame as a switching frame, i.e., the current frame is capable of dynamically switching a communication direction. The switching manager 515 may switch, based at least in part on the frame configuration message, a communication direction between the first cell and a UE 115 for at least a portion of the current frame. The switching manager 515 may, alone or in cooperation with the receiver 510 and/or transmitter 520, communicate with the UE 115 during the current frame according to the switched communication direction.

In some examples, the switching manager 515 may, in cooperation with the receiver 510, receive, at the apparatus 505 and from another cell, a frame configuration message. The frame configuration message may identify a current frame as a switching frame for the other cell. The switching manager 515 may determine that the first cell is located a predetermined distance from the other cell. The switching manager 515 may, alone or in cooperation with the receiver 510 and/or transmitter 520, delay a communication with the UE 115 during the current frame a gap time based at least in part on the current frame being a switching frame for the other cell and the apparatus 505 being the predetermined distance from the other cell.

Figure 6:
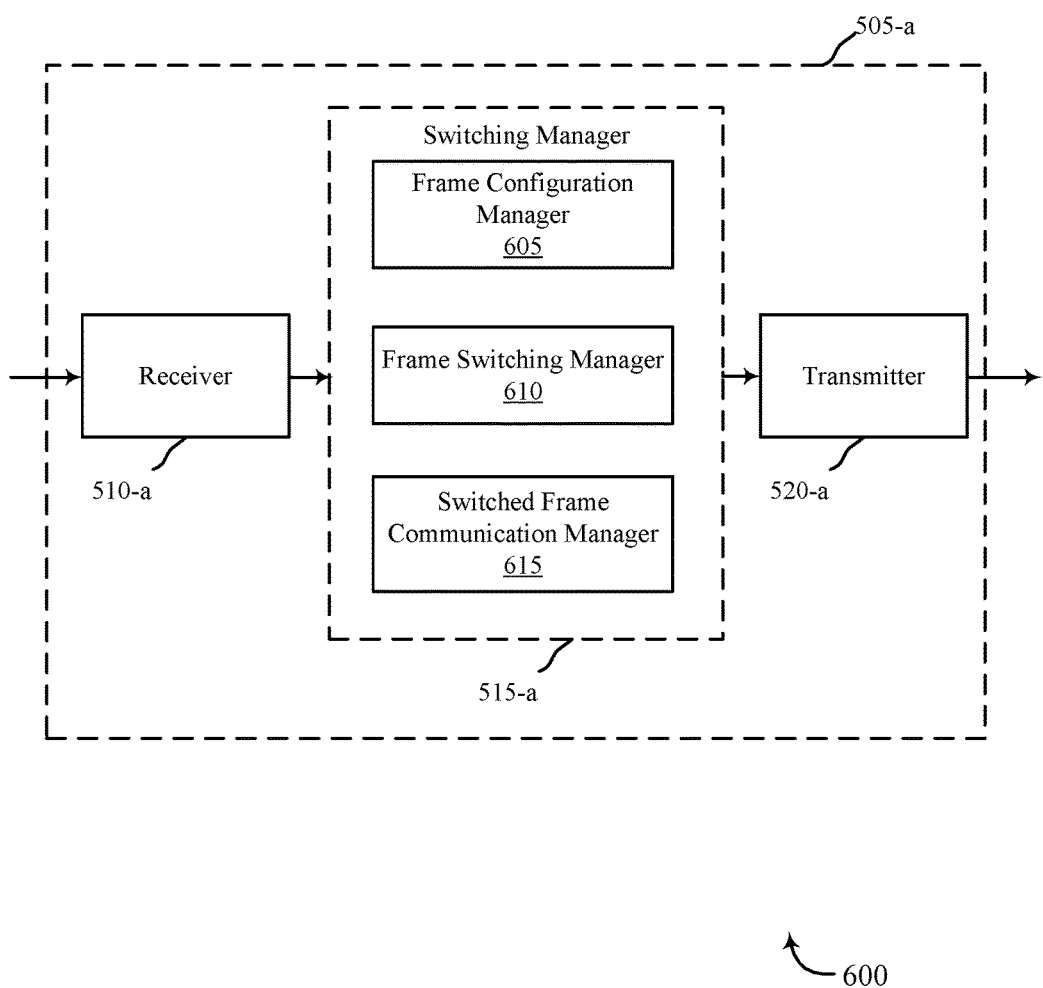
FIG. 6 shows a block diagram of an apparatus for use in wireless communication, in accordance with various aspects of the present disclosure.

FIG. 6 shows a block diagram 600 of an apparatus 505-a for use in wireless communication, in accordance with various aspects of the present disclosure. In some examples, the apparatus 505-a may be an example of aspects of one or more of the base stations 105 or cells described with reference to FIGS. 1-4, and/or an example of aspects of the apparatus 505 described with reference to FIG. 5. In some examples, the apparatus 505-a may be part or include an LTE/LTE-A eNB and/or an LTE/LTE-A base station. The apparatus 505-a may also be a processor. The apparatus 505-a may include a receiver 510-a, a switching manager 515-a, and/or a transmitter 520-a. The receiver 510-a and the transmitter 520-a may be an example of, and perform the functions of the receiver 510 and the transmitter 520, respectively, described with reference to FIG. 5. The switching manager 515-a may include a frame configuration manager 605, a frame switching manager 610, and a switched frame communication manager 615. Each of these components may be in communication with each other.

The frame configuration manager 605 may monitor, control, provide a means for, or otherwise manage aspects of configuring a frame as a switching frame or as a non-switching frame for the apparatus 505-a. The frame configuration manager 605 may transmit, from the apparatus 505-a to a plurality of neighboring cells, a frame configuration message. The frame configuration message may identify the current frame as a switching frame capable of dynamically switching a communication direction. The frame configuration message may include a PDCCH message. The frame configuration manager 605 may transmit a communication direction override message to the plurality of neighboring cells (e.g., an UL override message and/or a DL override message). The frame configuration manager 605 may receive, based at least in part on the frame configuration message, a CTS message from at least one of the plurality of neighboring cells.

In another example where the apparatus 505-*a* is a non-switching cell, the frame configuration manager 605 may receive, at the apparatus 505-*a* from a second cell, a frame configuration message. The frame configuration message may identify the current frame as a switching frame for the second cell.

The frame switching manager 610 may monitor, control, provide a means for, or otherwise manage aspects of a switching frame for the apparatus 505-*a*. The frame switching manager 610 may switch, based at least in part on the frame configuration message, a communication direction between the apparatus 505-*a* and a UE for at least a portion of the current frame. Switching the communication direction may include switching a downlink communication to an uplink communication. Switching the communication direction may include switching an uplink communication to a downlink communication.

In the example where the apparatus 505-*a* is a non-switching cell, the frame switching manager 610 may determine that the apparatus 505-*a* is a predetermined distance from the second cell. Therefore, the frame switching manager 610 may determine, based at least in part on the apparatus 505-*a* being a predetermined distance from the second cell, that the current frame is not a switching frame for the apparatus 505-*a*. The frame switching manager 610 may determine that the apparatus 505-*a* is associated with a cell cluster different from a cell cluster of the second cell.

The switched frame communication manager 615 may monitor, control, provide a means for, or otherwise manage aspects of communications during a switching frame for the apparatus 505-*a*. The switched frame communication manager 615 may communicate with a UE during the current frame according to the switched communication direction. The switched frame communication manager 615 may determine a gap time associated with the current frame being a switching frame and delay a communication with the UE for at least the gap time.

In the example where the apparatus 505-*a* is a non-switching cell, the switched frame communication manager 615 may delay a communication with the UE a gap time based at least in part on the current frame being a switching frame for the second cell and the apparatus 505-*a* being the predetermined distance from the second cell. The switched frame communication manager 615 may refrain, based at least in part on the current frame not being a switching frame for the apparatus 505-*a*, from converting a communication direction with the UE during the current frame. The gap time may be an extended gap time with respect to communication gap times associated with the second cell.

Figure 7:
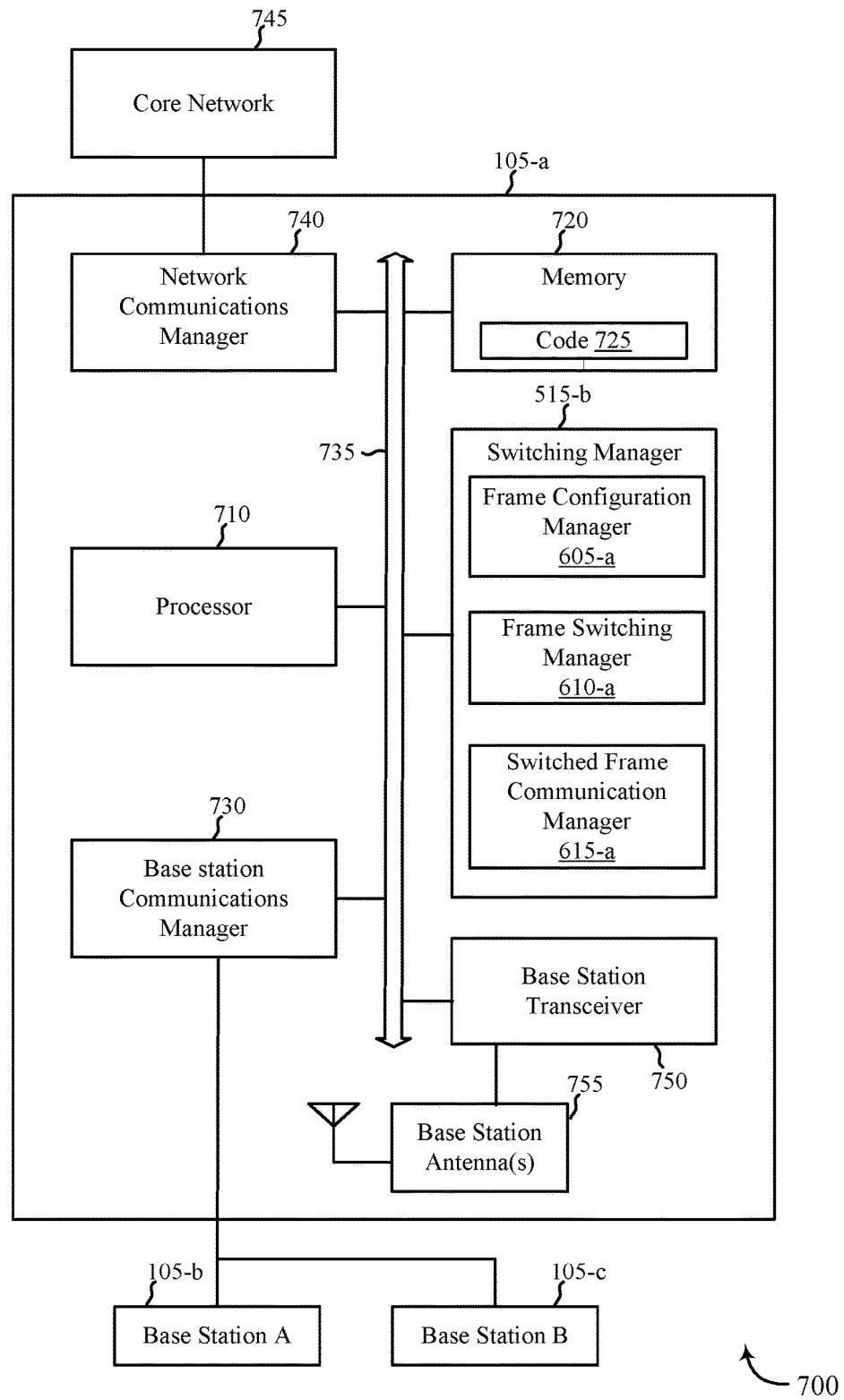
FIG. 7 shows a block diagram of a base station (e.g., a base station forming part or all of an eNB) for use in wireless communication, in accordance with various aspects of the present disclosure.

FIG. 7 shows a block diagram 700 of a base station 105-*a* (e.g., a base station forming part or all of an eNB and/or all or part of a cell) for use in wireless communication, in accordance with various aspects of the present disclosure. In some examples, the base station 105-*a* may be an example of aspects of one or more of the base stations 105 described with reference to FIG. 1, the cells described with reference to FIGS. 2-4, and/or aspects of one or more of the apparatus 505 when configured as a base station, as described with reference to FIGS. 5 and/or 6. The base station 105-*a* may be configured to implement or facilitate at least some of the base station and/or apparatus features and functions described with reference to FIGS. 1-4.

The base station 105-*a* may include a processor 710, a memory 720, at least one base station transceiver (represented by base station transceiver 750), at least one base station antenna (represented by base station antenna(s) 755), and/or a switching manager 515-*b*. The base station 105-*a* may also include one or more of a base station communications manager 730 and/or a network communications manager 740. Each of these components may be in communication with each other, directly or indirectly, over one or more buses 735.

The memory 720 may include random access memory (RAM) and/or read-only memory (ROM). The memory 720 may store computer-readable, computer-executable software/firmware code 725 containing instructions that are configured to, when executed, cause the processor 710 to perform various functions described herein related to wireless communication (e.g., dynamic frame switching, etc.). Alternatively, the computer-readable, computer-executable software/firmware code 725 may not be directly executable by the processor 710 but be configured to cause the base station 105-*a* (e.g., when compiled and executed) to perform various of the functions described herein.

The processor 710 may include an intelligent hardware device, e.g., a central processing unit (CPU), a microcontroller, an ASIC, etc. The processor 710 may process information received through the base station transceiver 750, the base station communications manager 730, and/or the network communications manager 740. The processor 710 may also process information to be sent to the base station transceiver 750 for transmission through the antenna(s) 755, to the base station communications manager 730, for transmission to one or more other base stations 105-*b* and 105-*c*, and/or to the network communications manager 740 for transmission to a core network 745, which may be an example of one or more aspects of the core network 130 described with reference to FIG. 1. The processor 710 may handle, alone or in connection with the switching manager 515-*b*, various aspects of dynamic communication direction switching during a switching frame.

The base station transceiver 750 may include a modem configured to modulate packets and provide the modulated packets to the base station antenna(s) 755 for transmission, and to demodulate packets received from the base station antenna(s) 755. The base station transceiver 750 may, in some examples, be implemented as one or more base station transmitter modules and one or more separate base station receiver modules. The base station transceiver 750 may support communications in a first radio frequency spectrum band and/or a second radio frequency spectrum band. The base station transceiver 750 may be configured to communicate bi-directionally, via the antenna(s) 755, with one or more UEs or apparatuses, such as one or more of the UEs 115 described with reference to FIGS. 1-4. The base station 105-*a* may, for example, include multiple base station antennas 755 (e.g., an antenna array used for directional transmissions). The base station 105-*a* may communicate with the core network 745 through the network communications manager 740. The base station 105-*a* may also communicate with other base stations, such as the base stations 105-*b* and 105-*c*, using the base station communications manager 730.

The switching manager 515-*b* may be configured to perform and/or control some or all of the features and/or functions described with reference to FIGS. 1-4 related to dynamic frame switching during at least a portion of the current frame. The switching manager 515-*b*, or portions of the switching manager 515-*b*, may include a processor, and/or some or all of the functions of the switching manager 515-*b* may be performed by the processor 710 and/or in connection with the processor 710. In some examples, the switching manager 515-*b* may be an example of the switching manager 515 and/or 515-*a* described with reference to FIGS. 5 and/or 6. For example, the switching manager 515-*b* may include a frame configuration manager 605-*a*, a frame switching manager 610-*a*, and a switched frame communication manager 615-*a*, which may be examples of and implement the functions of the frame configuration manager 605, the frame switching manager 610, and the switched frame communication manager 615, respectively, described with reference to FIG. 6.

Figure 8:
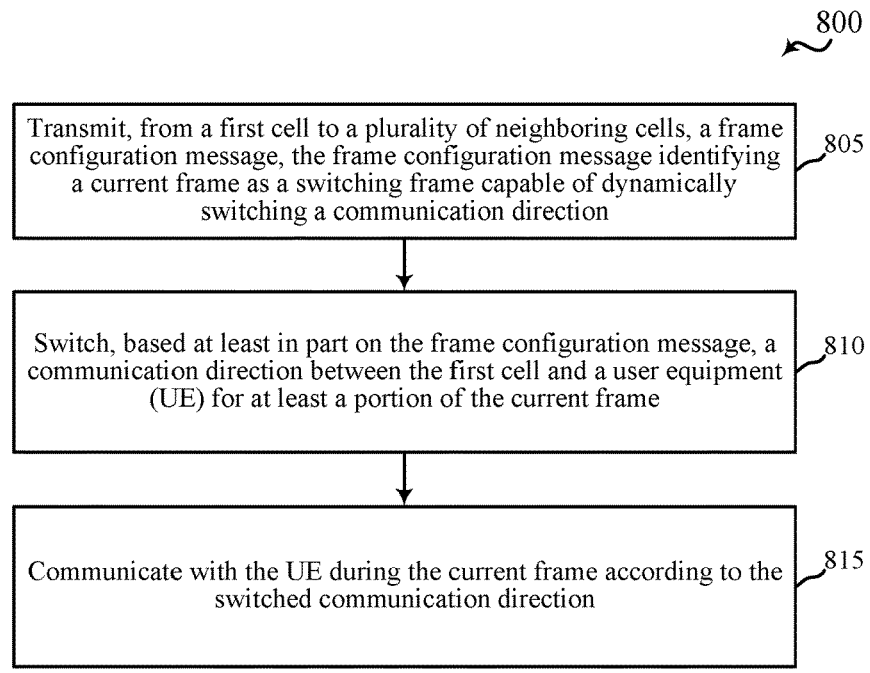
FIGS. 8 through 10 show flow charts illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of a cell, such as one or more of the base stations 105 described with reference to FIGS. 1 and 7, cells described with reference to FIGS. 2-4, and/or aspects of one or more of the apparatuses 505 described with reference to FIGS. 5-6. In some examples, a cell may execute one or more sets of codes to control the functional elements of the cell to perform the functions described below. Additionally or alternatively, the cell may perform one or more of the functions described below using special-purpose hardware.

At block 805, the method 800 may include the cell transmitting, from the cell to a plurality of cells, a frame configuration message, the frame configuration message identifying a current frame as a switching frame capable of dynamically switching a communication direction. The operation(s) at block 805 may be performed using the frame configuration manager 605 described with reference to FIGS. 6 and 7.

At block 810, the method 800 may include the cell switching, based at least in part on the frame configuration message, a communication direction between the cell and a UE for at least a portion of the current frame. The operation(s) at block 810 may be performed using the frame switching manager 610 described with reference to FIGS. 6 and 7.

At block 815, the method 800 may include the cell communicating with the UE during the current frame according to the switched communication direction. The operation(s) at block 815 may be performed using the switched frame communication manager 615 described with reference to FIGS. 6 and 7.

Figure 9:
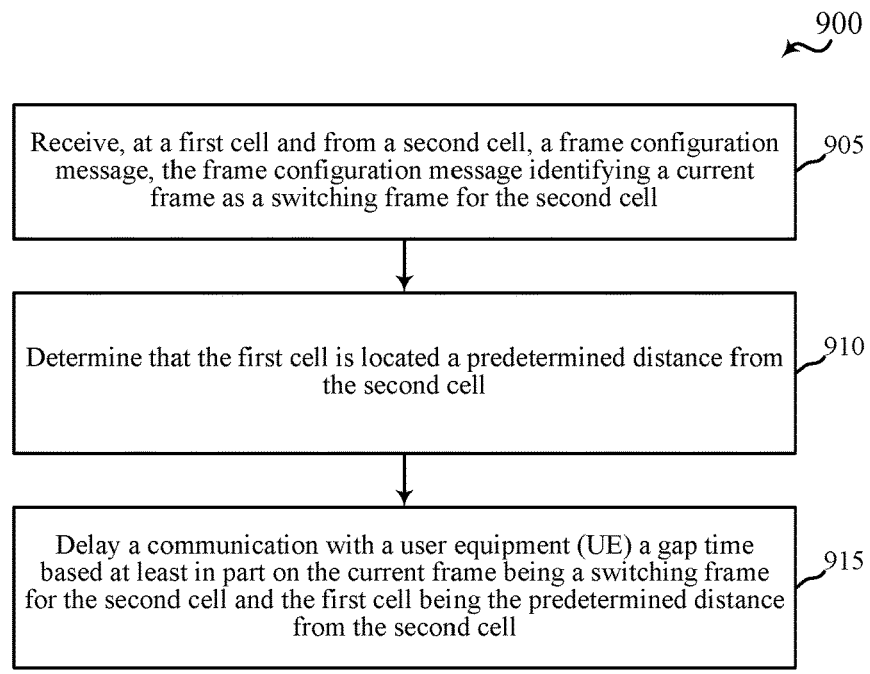

FIG. 9 is a flow chart illustrating an example of a method 900 for wireless communication, in accordance with various aspects of the present disclosure. For clarity, the method 900 is described below with reference to aspects of a cell, such as one or more of the base stations 105 described with reference to FIGS. 1 and 7, cells described with reference to FIGS. 2-4, and/or aspects of one or more of the apparatuses 505 described with reference to FIGS. 5-6. In some examples, a cell may execute one or more sets of codes to control the functional elements of the cell to perform the functions described below. Additionally or alternatively, the cell may perform one or more of the functions described below using special-purpose hardware.

At block 905, the method 900 may include the cell receiving, at the cell and from a second cell, a frame configuration message, the frame configuration message identifying a current frame as a switching frame for the second cell. The operation(s) at block 905 may be performed using the frame configuration manager 605 described with reference to FIGS. 6 and 7.

At block 910, the method 900 may include the cell determining that the cell is located a predetermined distance from the second cell. The operation(s) at block 910 may be performed using the frame switching manager 610 described with reference to FIGS. 6 and 7.

At block 915, the method 900 may include the cell delaying a communication with a UE a gap time based at least in part on the current frame being a switching frame for the second cell and the cell being the predetermined distance from the second cell. The operation(s) at block 915 may be performed using the switched frame communication manager 615 described with reference to FIGS. 6 and 7.

Figure 10:
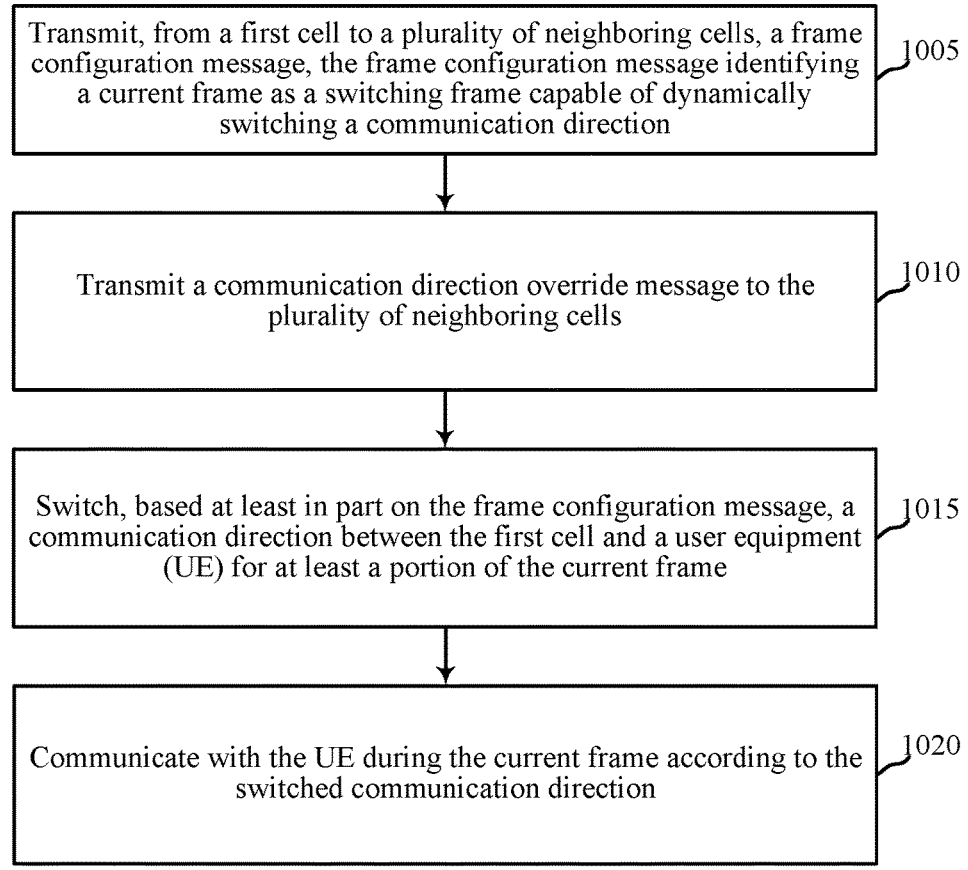

FIG. 10 is a flow chart illustrating an example of a method 1000 for wireless communication, in accordance with various aspects of the present disclosure. For clarity, the method 1000 is described below with reference to aspects of a cell, such as one or more of the base stations 105 described with reference to FIGS. 1 and 7, cells described with reference to FIGS. 2-4, and/or aspects of one or more of the apparatuses 505 described with reference to FIGS. 5-6. In some examples, a cell may execute one or more sets of codes to control the functional elements of the cell to perform the functions described below. Additionally or alternatively, the cell may perform one or more of the functions described below using special-purpose hardware.

At block 1005, the method 1000 may include the cell transmitting, from the cell to a plurality of cells, a frame configuration message, the frame configuration message identifying a current frame as a switching frame capable of dynamically switching a communication direction. The operation(s) at block 1005 may be performed using the frame configuration manager 605 described with reference to FIGS. 6 and 7.

At block 1010, the method 1000 may include the cell transmitting a communication direction override message to the plurality of neighboring cells. The operation(s) at block 1010 may be performed using the frame configuration manager 605 described with reference to FIGS. 6 and 7.

At block 1015, the method 1000 may include the cell switching, based at least in part on the frame configuration message, a communication direction between the cell and a UE for at least a portion of the current frame. The operation(s) at block 1015 may be performed using the frame switching manager 610 described with reference to FIGS. 6 and 7.

At block 1020, the method 1000 may include the cell communicating with the UE during the current frame according to the switched communication direction. The operation(s) at block 1020 may be performed using the switched frame communication manager 615 described with reference to FIGS. 6 and 7.

Thus, the methods 800-1000 may provide for wireless communication. It should be noted that the methods 800-1000 are just example implementations and that the operations of the methods 800-1000 may be rearranged or otherwise modified such that other implementations are possible. In some examples, aspects from two or more of the methods 800-1000 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) IEEE 802.11

(Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an Filed-Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
transmitting, from a first cell to a plurality of neighboring cells, a frame configuration message, the frame configuration message identifying a current frame as a switching frame capable of dynamically switching a communication direction;
transmitting, to the plurality of neighboring cells, a communication direction override message including an indication for at least one of the plurality of neighboring cells to use interference avoidance or mitigation techniques prior to any transmissions during at least a portion of the current frame;

switching, based at least in part on the frame configuration message, a communication direction between the first cell and a user equipment (UE) for at least a portion of the current frame; and communicating with the UE during the current frame according to the switched communication direction.

2. The method of claim 1, wherein switching the communication direction comprises:

switching a downlink communication to an uplink communication.

3. The method of claim 1, wherein switching the communication direction comprises:

switching an uplink communication to a downlink communication.

4. The method of claim 1, further comprising:

receiving, based at least in part on the frame configuration message, a clear-to-send (CTS) message from at least one of the plurality of neighboring cells.

5. The method of claim 1, further comprising:

determining a gap time associated with the current frame being the switching frame; and delaying a communication with the UE for at least the gap time.

6. The method of claim 1, wherein the frame configuration message comprises a physical downlink control channel (PDCCH) message.

7. A method for wireless communication, comprising:

receiving, at a first cell and from a second cell, a frame configuration message, the frame configuration message identifying a current frame as a switching frame for the second cell;

determining that the first cell is located a predetermined distance from the second cell; and delaying a communication with a user equipment (UE) a gap time based at least in part on the current frame being a switching frame for the second cell and the first cell being the predetermined distance from the second cell.

8. The method of claim 7, further comprising:

determining, based at least in part on the first cell being the predetermined distance from the second cell, that the current frame is not a switching frame for the first cell.

9. The method of claim 8, further comprising:

refraining, based at least in part on the current frame not being the switching frame, from converting a communication direction with the UE during the current frame.

10. The method of claim 7, wherein the gap time is an extended gap time with respect to communication gap times associated with the second cell.

11. The method of claim 7, wherein the first cell is associated with a cell cluster different from a cell cluster of the second cell.

12. An apparatus for wireless communication, comprising:

a processor;

memory in electronic communication with the processor; and instructions stored in the memory, the instructions being executable by the processor to:

transmit, from a first cell to a plurality of neighboring cells, a frame configuration message, the frame configuration message identifying a current frame as a switching frame capable of dynamically switching a communication direction;

transmit, to the plurality of neighboring cells, a communication direction override message including an indication for at least one of the plurality of neighboring cells to use interference avoidance or mitigation techniques prior to any transmissions during at least a portion of the current frame;

switch, based at least in part on the frame configuration message, a communication direction between the first cell and a user equipment (UE) for at least a portion of the current frame; and communicate with the UE during the current frame according to the switched communication direction.

13. The apparatus of claim 12, wherein the instructions to switch the communication direction are further executable by the processor to:

switch a downlink communication to an uplink communication.

14. The apparatus of claim 12, wherein the instructions to switch the communication direction are further executable by the processor to:

switch an uplink communication to a downlink communication.

15. The apparatus of claim 12, further comprising instructions executable by the processor to:

receive, based at least in part on the frame configuration message, a clear-to-send (CTS) message from at least one of the plurality of neighboring cells.

16. The apparatus of claim 12, further comprising instructions executable by the processor to:

determine a gap time associated with the current frame being a switching frame; and delay a communication with the UE for at least the gap time.

17. The apparatus of claim 12, wherein the frame configuration message comprises a physical downlink control channel (PDCCH) message.

18. An apparatus for wireless communication, comprising:

a processor;

memory in electronic communication with the processor; and instructions stored in the memory, the instructions being executable by the processor to:

receive, at a first cell and from a second cell, a frame configuration message, the frame configuration message identifying a current frame as a switching frame for the second cell;

determine that the first cell is located a predetermined distance from the second cell; and delay a communication with a user equipment (UE) a gap time based at least in part on the current frame being a switching frame for the second cell and the first cell being the predetermined distance from the second cell.

19. The apparatus of claim 18, further comprising instructions executable by the processor to:

determine, based at least in part on the first cell being the predetermined distance from the second cell, that the current frame is not a switching frame for the first cell.

20. The apparatus of claim 19, further comprising instructions executable by the processor to:

refrain, based at least in part on the current frame not being a switching frame, from converting a communication direction with the UE during the current frame.

21. The apparatus of claim 18, wherein the gap time is an extended gap time with respect to communication gap times associated with the second cell.

22. The apparatus of claim 18, wherein the first cell is associated with a cell cluster different from a cell cluster of the second cell.

23. An apparatus for wireless communication, comprising:
- means for transmitting, from a first cell to a plurality of neighboring cells, a frame configuration message, the frame configuration message identifying a current frame as a switching frame capable of dynamically switching a communication direction;
- means for transmitting, to the plurality of neighboring cells, a communication direction override message including an indication for at least one of the plurality of neighboring cells to use interference avoidance or mitigation techniques prior to any transmissions during at least a portion of the current frame;
- means for switching, based at least in part on the frame configuration message, a communication direction between the first cell and a user equipment (UE) for at least a portion of the current frame; and
- means for communicating with the UE during the current frame according to the switched communication direction.

24. The apparatus of claim 23, wherein the means for switching the communication direction comprises:
- means for switching a downlink communication to an uplink communication.

25. The apparatus of claim 23, wherein the means for switching the communication direction comprises:
- means for switching an uplink communication to a downlink communication.

26. The apparatus of claim 23, further comprising:
- means for receiving, based at least in part on the frame configuration message, a clear-to-send (CTS) message from at least one of the plurality of neighboring cells.

27. An apparatus for wireless communication, comprising:
- means for receiving, at a first cell and from a second cell, a frame configuration message, the frame configuration message identifying a current frame as a switching frame for the second cell;
- means for determining that the first cell is located a predetermined distance from the second cell; and
- means for delaying a communication with a user equipment (UE) a gap time based at least in part on the current frame being a switching frame for the second cell and the first cell being the predetermined distance from the second cell.

28. The apparatus of claim 27, further comprising:
- means for determining, based at least in part on the first cell being the predetermined distance from the second cell, that the current frame is not a switching frame for the first cell.

29. A non-transitory computer-readable medium storing computer-executable code for wireless communication, the code executable by a processor to:
- transmit, from a first cell to a plurality of neighboring cells, a frame configuration message, the frame configuration message identifying a current frame as a switching frame capable of dynamically switching a communication direction;
- transmit, to the plurality of neighboring cells, a communication direction override message including an indication for at least one of the plurality of neighboring cells to use interference avoidance or mitigation techniques prior to any transmissions during at least a portion of the current frame;
- switch, based at least in part on the frame configuration message, a communication direction between the first cell and a user equipment (UE) for at least a portion of the current frame; and
- communicate with the UE during the current frame according to the switched communication direction.

30. A non-transitory computer-readable medium storing computer-executable code for wireless communication, the code executable by a processor to:
- receive, at a first cell and from a second cell, a frame configuration message, the frame configuration message identifying a current frame as a switching frame for the second cell;
- determine that the first cell is located a predetermined distance from the second cell; and
- delay a communication with a user equipment (UE) a gap time based at least in part on the current frame being a switching frame for the second cell and the first cell being the predetermined distance from the second cell.

* * * * *